United States Patent
Schalz et al.

[11] Patent Number: 5,557,453
[45] Date of Patent: Sep. 17, 1996

[54] MICROSCOPE THAT DISPLAYS SUPERIMPOSED DATA

[75] Inventors: Karl-Josef Schalz, Weilburg; Norbert Gaul, Solms-Oberbiel, both of Germany

[73] Assignee: Leica Mikroskopie und Systeme GmbH, Wetzlar, Germany

[21] Appl. No.: 560,513

[22] Filed: Nov. 17, 1995

Related U.S. Application Data

[63] Continuation of Ser. No. 76,140, Jun. 14, 1993, abandoned.

[30] Foreign Application Priority Data

Jun. 12, 1992 [DE] Germany ............... 42 19 299.4

[51] Int. Cl.⁶ ............... G02B 21/22; G02B 21/00
[52] U.S. Cl. ............... 359/376; 359/368; 359/374
[58] Field of Search ............... 359/372, 374–377, 359/630, 636, 903, 391, 368, 425–428; 345/9, 31

[56] References Cited

U.S. PATENT DOCUMENTS

| | | | |
|---|---|---|---|
| 2,548,861 | 4/1951 | Brown | 359/427 |
| 2,942,345 | 6/1960 | Goldberg | 359/428 |
| 3,398,630 | 8/1968 | Dakin | 359/376 |
| 3,398,631 | 8/1968 | McGivern et al. | 359/376 |
| 3,514,180 | 5/1970 | Haefner | 359/375 |
| 3,565,534 | 2/1971 | Chaban | 359/376 |
| 3,672,782 | 6/1972 | Akin | 359/636 |
| 4,027,942 | 6/1977 | Fukushige | 359/375 |
| 4,057,318 | 11/1977 | Schindl | 359/363 |
| 4,166,673 | 9/1979 | Dona | 359/515 |
| 4,274,092 | 6/1981 | Vanusa et al. | 345/9 |
| 4,567,478 | 1/1986 | Schwab | 345/9 |

FOREIGN PATENT DOCUMENTS

| | | | |
|---|---|---|---|
| 0088985 | 9/1983 | European Pat. Off. | |
| 2933627 | 3/1980 | France | 359/630 |
| 2361692 | 9/1974 | Germany | |
| 874417 | 8/1961 | United Kingdom | 359/374 |

*Primary Examiner*—Thong Nguyen
*Attorney, Agent, or Firm*—Foley & Lardner

[57] ABSTRACT

A microscope includes a mount 18 secured to an eyepiece tube 10 to superimpose image data upon the microscope image. The image data is projected and reflected into the intermediate image plane using a receiving unit 27 to hold the image data on a slide 29 and an optical part 12. The receiving unit 27 includes a magnetic wall surface 31 and is freely movable and arbitrarily positionable together with slide 29 on a slide surface 32. Permanent magnets 33 are provided behind the slide surface 32 within the mount 18 to keep receiving unit 27 in place.

6 Claims, 1 Drawing Sheet

MICROSCOPE THAT DISPLAYS SUPERIMPOSED DATA

This application is a continuation of application Ser. No. 08/076,140, filed Jun. 14, 1993, now abandoned.

BACKGROUND OF THE INVENTION

The invention is directed to a microscope which displays superimposed data.

European Patent Publication No. EU 88,985B1 discloses a photomicroscope having a device for superimposing additional information on an image in a binocular tube. In this photomicroscope, a liquid crystal display (LCD) field is used to display transparent signs and/or symbols. The LCD field is illuminated by a light projection device. The LCD field includes electrically drivable segments which are imaged into the intermediate image plane in the eyepiece tube. A separately switchable partial region of the display field or a second separately illuminable display field is provided in the film plane using reflectors. In this device, one portion of information is visible to the observer during use of the microscope, while a different portion of information passes into the image plane for imaging and is not readily accessible for visual observation.

It is known from U.S. Pat. No. 4,274,092 to reflect an LED display into one of two eyepieces of a microscope. To accomplish this, one end of a tubular attachment is secured laterally at one of the eyepiece connections and at the other end of the tubular attachment an LED display is provided. The LED display is connected via an electronic control circuit to a computer into which display data can be input. This data is then superimposed on the microscope image by feedback via the LED display. In the case of this conventional microscope, reflecting-in into the intermediate image plane of the eyepiece does not take place. For this reason, the superimposed display cannot be photographed. Also, movement of the display is not possible.

German Patent Publication No. DE-OS-2,361,692 discloses a microscope with a photographic camera. In this arrangement, the image of the object which is formed on the image recording plane of the camera can be sharply focused using an auxiliary image of a sharpness indicator. The auxiliary image is superimposed on the beam path of a visual observation device. For this purpose, the beam path is branched off from the object beam path by a beam splitter disposed within the binocular tube of the microscope and the auxiliary image is superimposed on the microscope image by an optical imaging system. The sharpness indicator is fixed in the microscope and is therefore not moveable.

Accordingly, there is a need for an improved microscope which overcomes the shortcomings of the microscopes discussed above.

SUMMARY OF THE INVENTION

An object of the invention is to provide a microscope in which arbitrary image data can be superimposed on the visual image of the microscope by a device consisting of only a few components which are displaceable in relation to the image and can be independently fixed in any desired position.

According to a first aspect of the invention, there is provided a microscope which includes an eyepiece tube and a mount attachable to the eyepiece tube. The mount superimposes additional image data upon the microscope image by projecting and reflecting-in the additional image data into an intermediate image plane in the eyepiece tube. A receiving unit is located within the mount to hold the additional image data. A slide surface is provided within the mount parallel to an object plane formed by the additional image data to permit movement of the receiving unit while the receiving unit is holding the additional image data when force is applied to the receiving unit. An assembly maintains the receiving unit in its current position when the force is no longer applied.

Thus, the invention permits markings such as reference arrows, edgings, numbers, letters, graphical representations, and the like, to be placed in the microscope image by the observer in any desired position. The invention also permits these markings to be photographically recorded.

In one embodiment, the image data is on a mounted slide which can be clamped in the mount using a spring. Thus, widely varying image data can be prepared in a simple manner for appropriate microscope applications and slide mounts of differing thicknesses can be employed.

The slide surface can include a layer of magnetic material and permanent magnets can be provided on the mount. Thus, a slide carrying image data can be easily displaced in the x and y directions and rotated by hand. The set position is maintained after the movement has ceased.

Other objects, features, and advantages of the invention will be apparent from the detailed description of preferred embodiments set forth below.

BRIEF DESCRIPTION OF THE DRAWING

The invention will be described in further detail below with reference to the accompanying drawing which illustrates a preferred embodiment of the invention.

DETAILED DESCRIPTION OF PREFERRED EMBODIMENTS

Figure 1:
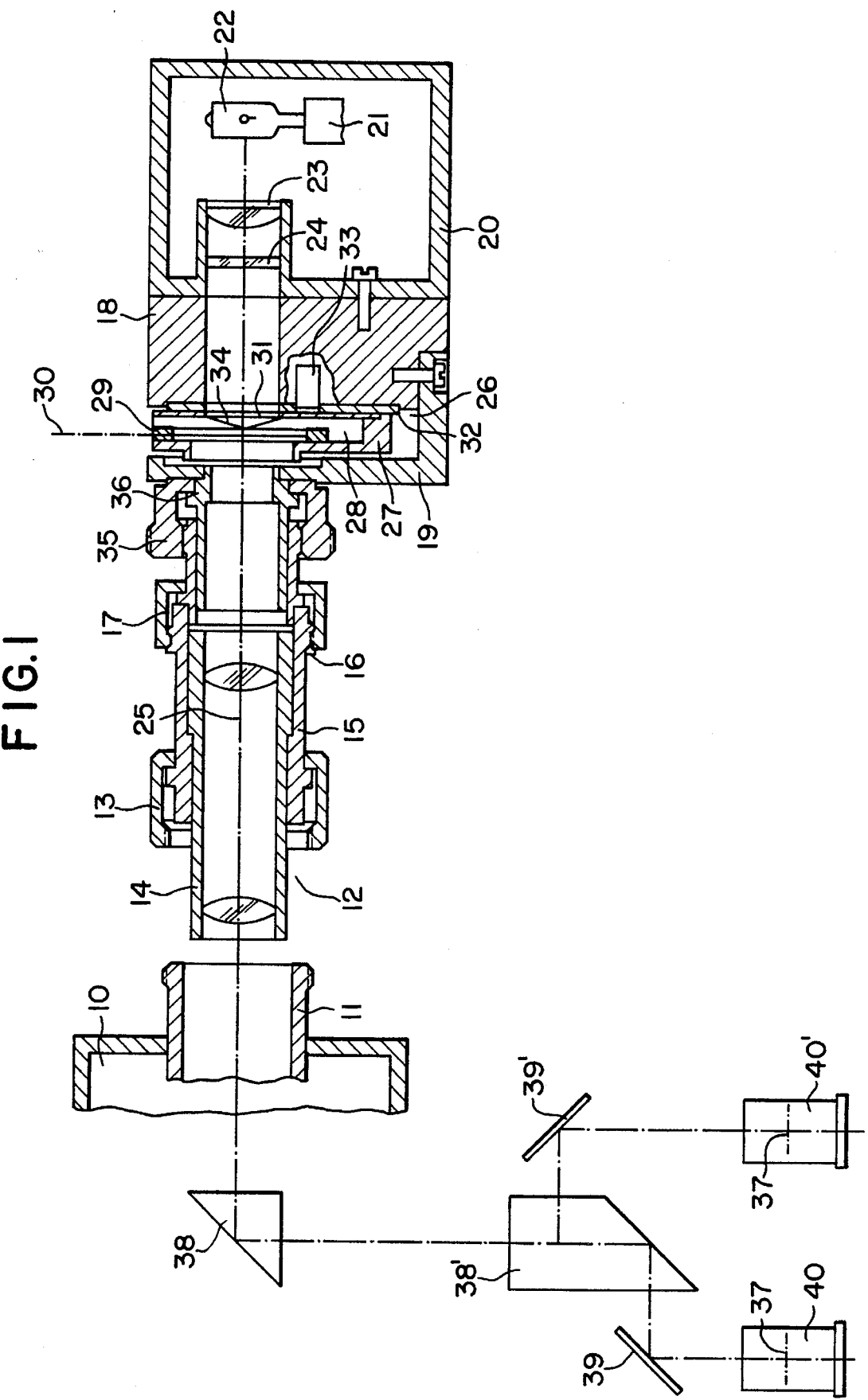

FIG. 1 illustrates a preferred embodiment of the invention. Components which are conventional and are not required for an understanding of the invention are not shown in FIG. 1 for the sake of clarity.

In FIG. 1, a recording connection 11 for a substantially tubular optical part 12 is provided on a binocular eyepiece tube 10 of a microscope at right angles to the direction of viewing. Optical part 12 is secured by a connecting ring 13 to the recording connection 11. The connection can be, for example, a screwed connection. The optical part 12 includes a carrier tube 14 and a casing 15 surrounding the carrier tube. Lenses are secured inside the carrier tube 14. The casing 15 includes, at the end opposite the connecting ring 13, a shaped-on threaded ring 16, which is screwed to an end connection ring 17 of a mount 18.

The mount 18 is in the form of a cylindrical housing 19 with flattened-off side surfaces. A similar-shaped cylindrical lamp house 20 is secured to housing 19. The lamp house 20 contains a projection lamp 22 mounted on a lamp mount 21 and a condenser lens 23 with an infrared filter 24 placed in front. This provides a projection beam path 25 in optical part 12.

In the housing 19 of the mount 18 a slit-shaped recess 26 is provided in which a receiving unit 27 having an insertion slit 28 for a mounted slide 29 containing image data is inserted. Slide 29 lies in an object plane 30 of the projection beam path 25.

The receiving unit 27 is a circular-segment-shaped plate. One of the wall surfaces 31 of the receiving unit 27 which faces the lamp house 20 is composed of a magnetic material, for example sheet steel, or is coated with such a material. The wall surface 31 lies against a slide surface 32, which is formed of a low-friction plastic coating, for example polytetrafluoroethylene, on a side wall of the mount 18. Rod-shaped permanent magnets 33 are inserted in the mount 18 (only one magnet is shown in FIG. 1). The spacing between the magnets 33 and wall surface 31 of magnetic material can be variable Thus, in the gap between the wall surface 31 and the permanent magnets 33 there is a magnetic field in which the receiving unit 27, together with slide 29, is freely movable within recess 26 when force is applied to the receiving unit.

The receiving unit 27 can be conveniently grasped by hand and arbitrarily displaced due to the flattened-off side surfaces of the housing 19. After the hand motion has ceased, the receiving unit 27 together with slide 29 automatically remain in the desired position.

To permit the use of slides 29 of differing thicknesses, a spring 34 is provided at the wall surface 31. Sharp focusing is performed using a focusing ring 35, which is secured on a tube socket 36 of the mount 18, and which upon actuation displaces the mount 18 in relation to the optical part 12 in the axial direction and thus adjusts for any deviation in the object plane 30.

Lamp 22, condenser 23, and optical part 12 together form a conventional projection device which images image data on slide 29 into an intermediate image plane in the binocular tube 10. By imaging into the intermediate image plane 37, image data is superimposed on the microscope image, can be viewed using both eyes, and can also be photographed and transmitted, for example onto a screen. In the binocular tube 10, the projection beam path 25 impinges on prism 38, 38' is deflected by the prism and mirrors 39, 39'. The image data is therefore imaged, in the intermediate image plane 37 of the two eyepieces 40, 40' of the binocular tube 10 and is thus viewed together with the microscope image.

Although the invention has been described above with reference to certain specific embodiments, the scope of the invention is not limited to the embodiments described above. Other designs, modifications, and applications within the spirit and scope of the invention will be apparent to those skilled in the art after receiving the above teachings. For example, the receiving unit can be fixed by static friction within the mount and the mount can be integral with the optical part. The scope of the invention, therefore, is defined with reference to the following claims.

What is claimed is:

1. A microscope, comprising:

an eyepiece tube;

a mount attachable to said eyepiece tube to superimpose additional image data upon a microscope image by projecting and reflecting-in said additional image data into an intermediate image plane in said eyepiece tube;

a receiving unit located within said mount to hold said additional image data;

a slide surface, located within said mount parallel to an object plane formed by said additional image data, to permit free and continuous movement of said receiving unit, along two perpendicular axes lying in the object plane, while said receiving unit is holding said additional image data in the object plane when force is applied to said receiving unit; and an assembly to maintain said receiving unit in any desired position in the object plane, at a user's option, when said forced is no longer being applied.

2. A microscope as claimed in claim 1, further comprising an optical part disposed between said eyepiece tube and said mount.

3. A microscope as claimed in claim 1, wherein said additional image data is located on a mounted slide which is clamped in said receiving unit by a spring.

4. A microscope as claimed in claim 1, wherein a low-friction plastic material is used as said slide surface.

5. A microscope, comprising:

an eyepiece tube;

a mount attachable to said eyepiece tube to superimpose additional image data upon a microscope image by projecting and reflecting-in said additional image data into an intermediate image plane in said eyepiece tube;

a receiving unit located within said mount to hold said additional image data;

a slide surface, located within said mount parallel to an object plane formed by said additional image data, to permit free and continuous movement of said receiving unit while said receiving unit is holding said additional image date in the object plane when force is applied to said receiving unit; and an assembly to maintain said receiving unit in any desired position in the object plane, at a user's option, when said force is no longer being applied;

wherein said receiving unit includes a surface of magnetic material and wherein at least one permanent magnet is inserted into said slide surface at a spacing from said surface of magnetic material.

6. A microscope as claimed in claim 5, wherein said spacing of said at least one permanent magnet from said surface of magnetic material is variable.

\* \* \* \* \*